S. Eich,

Shutter.

No. 104,717. Patented June 28, 1870.

Witnesses:
L. S. Mabee
Alex. H. Roberts

Inventor:
S. Eich.
per Munn & Co
Attorneys.

United States Patent Office.

STEPHAN EICH, OF EAST TOLEDO, OHIO.

Letters Patent No. 104,717, dated June 28, 1870.

---

IMPROVEMENT IN WINDOW-BLINDS.

---

The Schedule referred to in these Letters Patent and making part of the same

---

*To all whom it may concern:*

Be it known that I, STEPHAN EICH, of East Toledo, in the county of Lucas and State of Ohio, have invented a new and useful Improvement in Inside Window-Blind; and I do hereby declare that the following is a full, clear, and exact description thereof, which will enable others skilled in the art to make and use the same, reference being had to the accompanying drawing forming part of this specification.

Similar letters of reference indicate corresponding parts.

My invention has for its object improvement in that class of window-blinds which is provided with slotted slides, for wholly or partially closing the openings between the slats; and The invention consists in the particular construction and arrangement of parts, as hereinafter fully described, and as specifically stated in the claim.

A is the main frame of the blind, which may be hinged in place in the ordinary manner.

Figure 1:
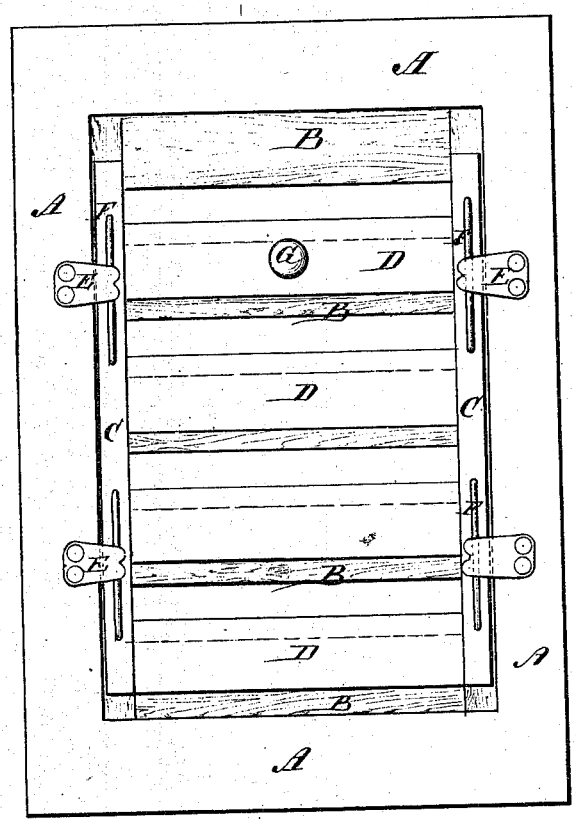
Figure 1 is a front view of my improved blind.
Figure 2:
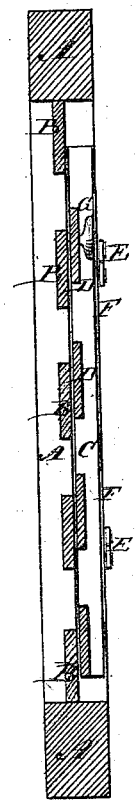
Figure 2 is a vertical section of the same, taken through the line $x\ x$, fig. 1.

B are vertical cross-slats, the ends of which are secured to the side bars of the frame A at suitable distances apart, as shown in figs. 1 and 2.

The inner edges of the side bars of the frame A are rabbeted, to receive the bars C, which are made shorter than the said rabbets, so that the said bars may have a short longitudinal movement.

The cross-bars or slats B are attached to the frame A, in such a manner that their inner surfaces may be flush with the bottoms of the rabbets in the frame A.

To the bars C are attached the ends of the cross-slats B, in such positions that their outer surfaces may be flush with the outer sides of the said bars C, so that the said slats D may fit closely to the slats B.

The distance apart of the slats D must correspond with the distance apart of the slats B, so that the movable part C D of the blind may be so adjusted as to fully close or fully uncover the spaces between the said slats B.

The movable part C D of the blind is kept in place upon the part A B by stationary buttons or clamps, E, which may be made elastic, and which are attached to the side bars of the frame A, and overlapping the bars C, as shown in fig. 1.

The bars C are kept from being worn by the clamps or buttons E, as the said bars are moved up and down by means of the wires F, attached to the bars C, for the said buttons or clamps E to bear upon, as shown in figs. 1 and 2.

The movable part C D of the blind may have a knob, as G, attached to it, for convenience in moving it up and down.

I am aware of the patent of G. A. Lathrop, dated December 13, 1859, and that of Bruff, dated May 6, 1856; but I claim nothing therein shown, as my invention pertains to an improvement on said patents.

Having thus described my invention,

I claim as new and desire to secure by Letters Patent—

The spring clamps E, arranged on side of the frame A of the blind, and bearing on the wires F of the movable frame C D, all as shown and described.

STEPHAN EICH.

Witnesses:
ANDREW SAXANOR, Jr.,
GEORG JAKOB SAXANOR.